United States Patent [19]

de Marcellus

[11] 4,278,133
[45] Jul. 14, 1981

[54] ATTACHMENTS FOR LAWN EDGERS

[76] Inventor: Roland de Marcellus, 151 Riviera Dr., Riviera Beach, Fla. 33404

[21] Appl. No.: 921,719

[22] Filed: Jul. 3, 1978

[51] Int. Cl.³ .................... A01B 33/02; A01B 35/28
[52] U.S. Cl. ............................ 172/14; 172/42; 172/45; 172/123; 37/43 E; 37/53
[58] Field of Search .................. 172/13, 14, 15, 16, 172/17, 42, 43, 123; 37/43 K, 53, 43 E, 43 R

[56] References Cited

U.S. PATENT DOCUMENTS

| 2,614,473 | 10/1952 | Yacoby | 172/43 X |
|---|---|---|---|
| 2,778,233 | 1/1957 | Perry | 172/42 X |
| 2,882,977 | 4/1959 | Smith | 172/15 |
| 2,913,058 | 11/1959 | Smith | 172/14 |
| 3,102,376 | 9/1963 | Henderson | 172/15 |
| 3,125,165 | 3/1964 | Boudreaux | 172/14 |
| 3,429,061 | 2/1969 | Haban | 37/43 E |
| 3,590,926 | 7/1971 | Tepera | 172/15 |
| 3,594,997 | 7/1971 | Tubesing | 172/14 |
| 3,656,554 | 4/1972 | Buhner | 172/14 |
| 4,002,205 | 1/1977 | Falk | 172/15 |
| 4,062,408 | 12/1977 | Enters | 172/42 |
| 4,072,195 | 2/1978 | Carlson | 172/15 |

Primary Examiner—Richard J. Johnson
Attorney, Agent, or Firm—Boris Haskell

[57] ABSTRACT

A motor powered lawn edger is converted to a lawn cultivator, a snow blower, or an ice chipper by removal of the lawn edging blade and its housing, and substitution therefor of a cultivating, blowing or chipping blade and an appropriate housing.

11 Claims, 13 Drawing Figures

ATTACHMENTS FOR LAWN EDGERS

SUMMARY OF THE INVENTION

The present invention relates to attachments for motor powered home lawn edgers, and more particularly relates to lawn cultivator and snow blower attachments for such edgers.

Motor powered home lawn edgers are well known. In general, they comprise a chassis mounted on three wheels carrying a motor that may be gasoline or electric powered. In addition the chassis carries a cutting disc or edger blade that is mounted approximately in the normal position for a fourth wheel. Through a pulley and belt drive, the motor drives the cutting disc about a horizontal axis. In use, the edger is positioned so that the cutting disc penetrates into the sod about an inch or two on a line where it is desired to edge the sod, such as along the edge of a walkway, flower bed, or the like. As the edger is walked along that line, the rotating cutting blade trims any overhanging grass and cuts any sod in its path, so that all growth extending beyond the line of cut can be readily removed.

In accordance with the present invention, the conventional lawn edger is converted to a cultivator by providing a cultivator blade interchangeable with the edger cutting disc. This cultivator blade comprises a multitined structure whose tines are spaced axially along a central shaft and radiate therefrom. The tines at their ends are bent in a compound fashion to provide both an offset from the tine axis and a twist or pitch about that axis. Thus, when the edger's cutting disc is removed and replaced by the cultivator blade, and the blade is driven by the motor, the cultivator blade cuts a swath in the turf equal in width to the axial length of the blade. Alternatively, the cultivator blade, or another interchangeable blade may be used to blow snow or chip ice from a walkway, driveway, or the like. To enhance the safety and efficiency of these attachments, an appropriate housing or shroud for the blade may also be provided.

It is therefore one object of the present invention to provide for the ready conversion of a motor powered lawn edger to a motor powered cultivator, snow blower or ice chipper.

Another object to the present invention is to provide interchangeable blades for a motor powered lawn edger, whereby the edger may be converted to a lawn cultivator, snow blower or ice chipper.

Other objects and advantages of the present invention will become apparent to those skilled in the art from a consideration of the following detailed illustrative description of the invention had in conjunction with the accompanying drawings.

DETAILED DESCRIPTION

Figure 1:
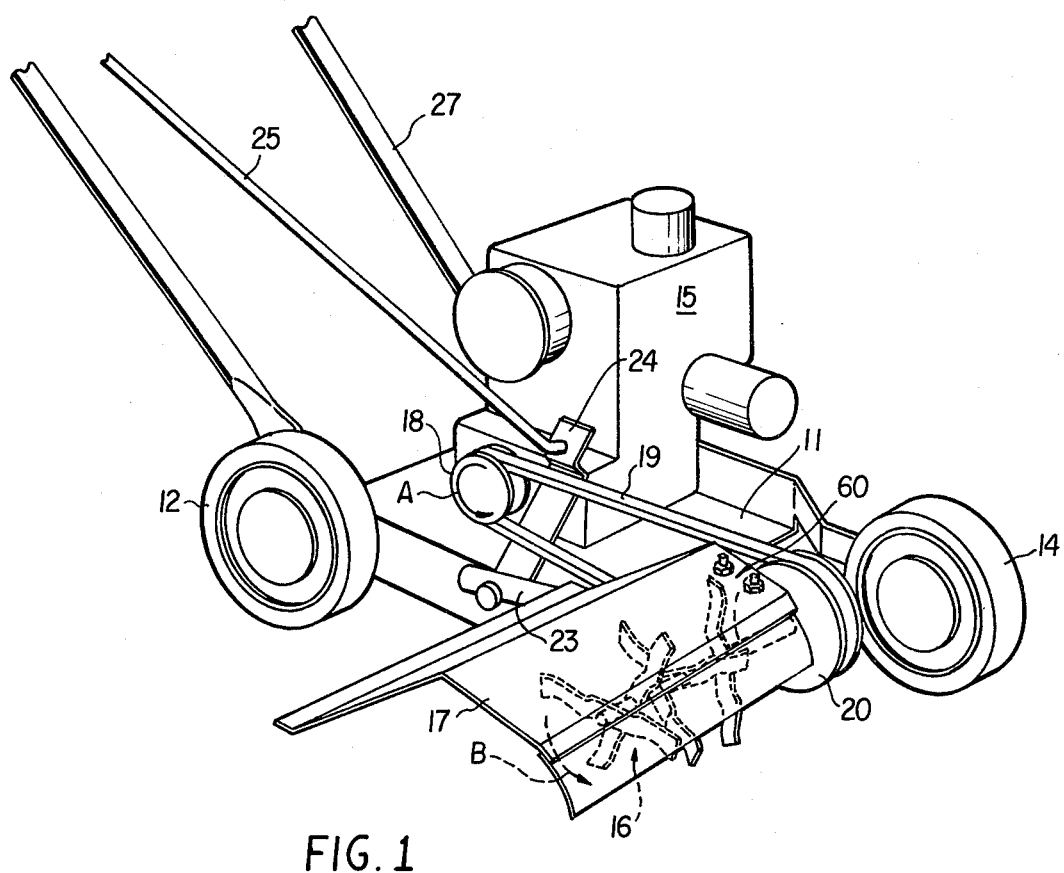
FIG. 1 is a perspective view of a conventional lawn edger, wherein the edger cutting disc and housing or shroud are removed and a cultivator blade and appropriate housing or shroud are substituted therefor, conventional portions of the edger structure being shown somewhat schematically.
Figure 2:
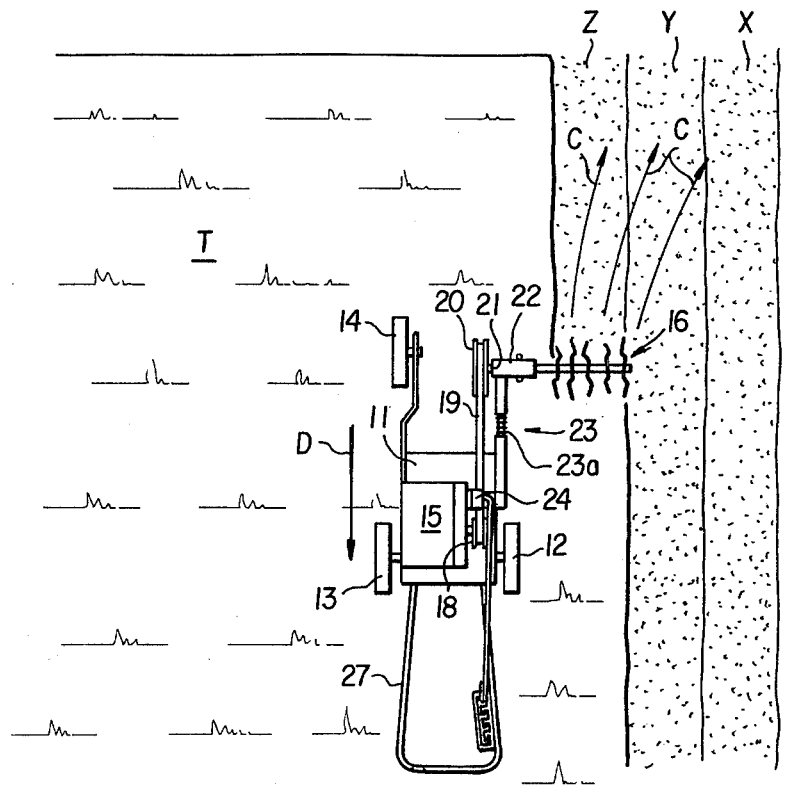
FIG. 2 is a top plan view of the edger as modified in FIG. 1, with the blade shroud removed for clarity, showing its operation in cultivating a lawn.

FIGS. 1 and 2 depict a conventional motor powered lawn edger, whose conventional edging cutter blade and housing have been removed, and the lawn cultivating attachment of the present invention has been substituted therefor. The basic edger comprises a chassis 11 mounted on three wheels 12, 13 and 14. The two rear wheels 12 and 13 are positioned to the right and left of the fore and aft center line of the chassis, while the single front wheel 14 is positioned to the left of the center line. A gasoline powered motor 15 is mounted on the chassis. On the front of the chassis and to the right of the center line, the edger chassis normally carries an edger cutting blade and a protective housing, shroud or guard over the top of the blade, with the bottom portion of the blade depending below the chassis for cutting engagement with the sod, so that the blade will cut or trim the sod as the edger traverses over it.

In accordance with the present invention, the cutting blade and its guard housing, which are normally secured in placed by threaded engagements, are removed, and in the instant embodiment, are replaced by a multitined cultivator rotor or blade 16 and its guard housing 17. As in the case of the normal edger cutting blade, when the cultivator blade 16 is secured in its place, it is driven by the motor 15 through power take off pulley sheave 18, belt 19 and output pulley sheave 20. Sheave 20 rotationally drives the stub shaft 21 in journal bearing 22, and the shaft rotationally drives the cultivator blade 16 secured thereto. Drive sheave 18 is rotated in a counterclockwise direction as viewed in FIG. 1 and as depicted by arrow A, and this in turn causes the blade 16 to rotate counterclockwise as depicted by arrow B. The assembly of pulley sheave 20, journal 22 and blade 16 are mounted on the chassis bracket 23, which is pivotally mounted to the main chassis deck, so that the position of the blade 16 can be raised or lowered relative to ground level through level 24 and actuator rod 25.

Figure 11:
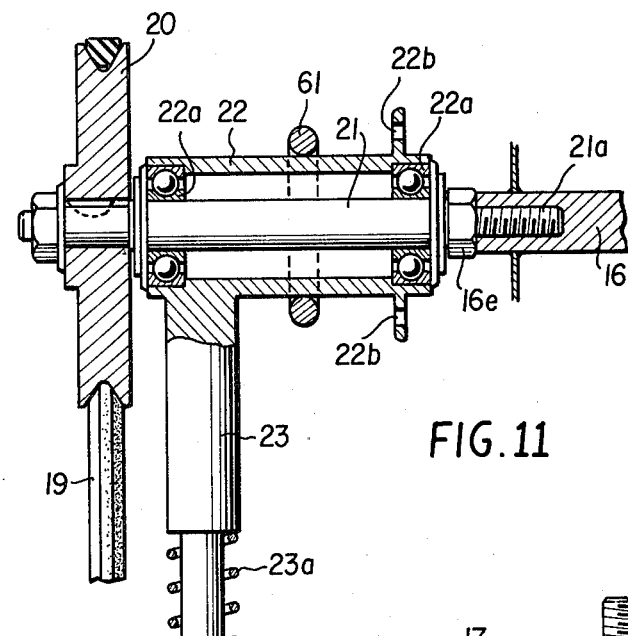
FIG. 11 is a fragmentary enlarged sectional view of the drive shaft and journal for the blade taken along line 11—11 of FIG. 10.

Details of the stub shaft 21 and its journal bearing 22 are shown in the longitudinal section of FIG. 11. As there shown, shaft 21 is keyed and threadingly fastened to pulley sheave 20 for rotation within the bearings 22a of the bearing journal 22. The journal 22 is in turn integral with and carried by the chassis bracket 23, which has an axially expandable telescopic structure, which functions under the influence of spring 23a to push the journal 22 and sheave 20 outwardly, thereby maintaining a tension on the drive belt 19. It will also be observed from FIG. 11 that the cultivator blade 16 is attached to stub shaft 21 by means of an axially threaded engagement 21a and a lock nut 16e.

Figure 10:
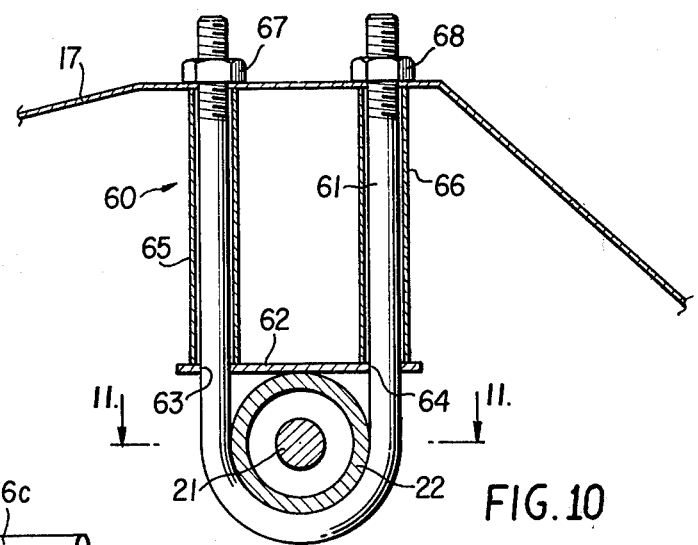
FIG. 10 is a fragmentary enlarged view of a clamp structure for mounting the shroud to the journal for the blade.

The apertured ears 22b projecting from the bearing journal 22 are used to secure the normal edger guard housing, or shroud. Although these ears could be used to secure the cultivator shroud 17, it is preferred to use a clamp structure engaging about the journal 22, so that the attachment of the present invention would be readily applicable to edgers of different manufacturers. This clamp structure 60 is best shown in the sectional view of FIG. 10. It comprises a U-bolt 61, a clamp plate 62 apertured at 63 ad 64 to be received over the legs of the U-bolt. Spacer sleeves 65 and 66 are also received over the legs of the U-bolt, and nuts 67 and 68 threaded over the ends of the U-bolt retain and clamp the assembly. The foregoing assembly is applied over the bearing journal 22 with the journal positioned between the base of the U-bolt and clamping plate 62. The guard housing or shroud 17 is provided with apertures adapted to receive the ends of the U-bolt, and this housing is located between the spacer sleeves 65 and 66 and nuts 67 and 68. Thus assembled, tightening of nuts 67 and 68 clamps the structure to the bearing journal 22, and mounts the guard housing or shroud 17. It is apparent that with this assembly, the guard housing 17 may be tilted about the axis of the bearing journal 22 to a position best suited to deflect any flying debris, etc. thrown by operation of the cultivator blade 16

Figure 3:
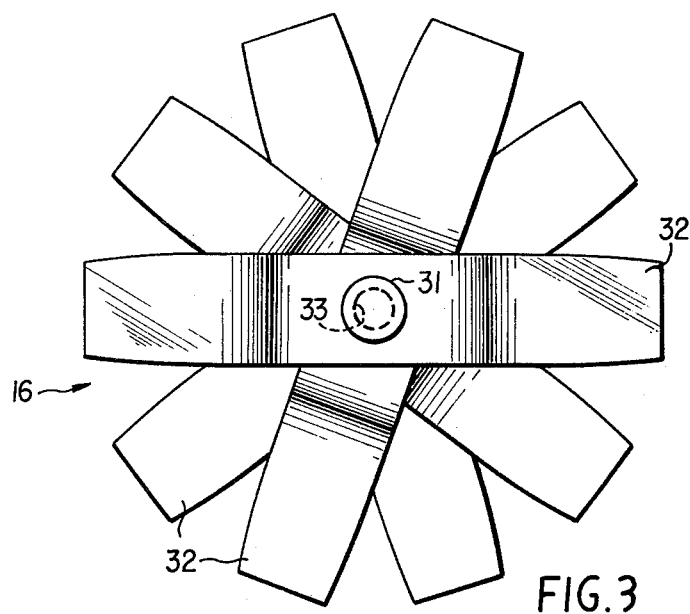
FIG. 3 is an end view of the cultivator blade.
Figure 4:
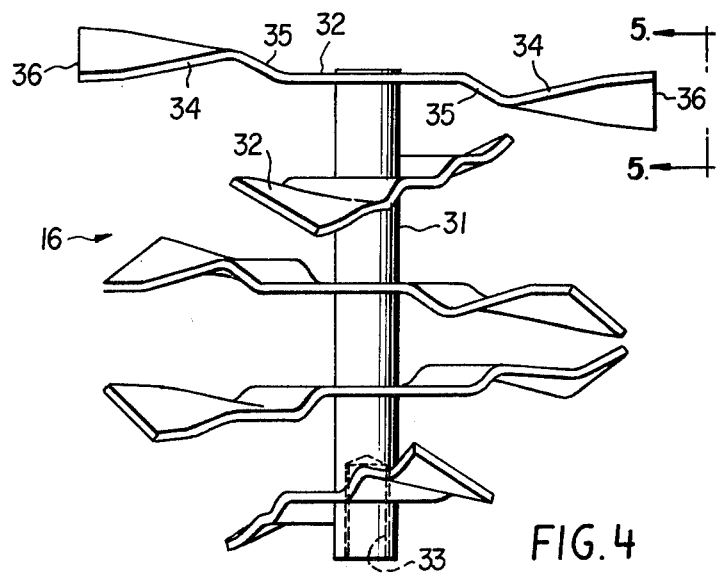
FIG. 4 is a top plan view of the cultivator blade.
Figure 5:
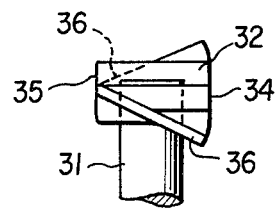
FIG. 5 is an end view of a tine of the cultivator blade, taken along the line 5—5 of FIG. 4.

The cultivator blade 16 is shown in the detailed isolated views of FIGS. 3-5. It comprises a central shaft 31 on which are mounted a number of radiating tines 32 axially spaced along the shaft 31. One end of shaft 31 is internally threaded at 33 for mounting on the threaded end of stub shaft 21. The end of each radiating tine 32 is twisted at 34 about its axis so as to form an angled cutting edge 36 that will tend to propel cut sod in a direction generally forwardly and slightly to the right of the edger machine, as shown by the arrows C in FIG. 2, when the blade 16 is mounted and driven as shown and described with reference to FIG. 1. For economy in manufacture, the tines are formed as tine pairs, i.e. two oppositely radiating tines are formed as an integral piece which is centrally bored and mounted on and welded to the shaft 31. In order that each tine of the pair will make cuts in the sod along adjacent but displaced lines, each tine of the pair is offset from its mounting axis at 35 in opposite directions. When these tines 32 are properly positioned along the axis of the shaft 31, the cylindrical plane described by the circular path of each cutting edge 36 on rotation of shaft 31 will be displaced from and essentially contiguous with the cylindrical plane described by the opposite tine of each tine pair (as seen by the view of FIG. 5), and further, the combined cylindrical planes defined by each tine pair will be nearly or substantially contiguous with the combined cylindrical planes of an adjacent tine pair. Thus, one traverse of the blade 16 will cultivate a continuous swath whose width is substantially equal to the length of the blade shaft 31. The tines 32 are angularly displaced relative to each other about the axis of shaft 31. Through this orientation, only one tine at a time will contact and cut the turf during operation of the machine, thereby minimizing the power requirements, and enabling the cultivator to operate effectively and efficiently from the power available from the conventional home lawn edger.

In operation of the present invention, the machine is placed on the turf to be cultivated, and the level of the cultivator blade assembly is adjusted to provide the desired blade penetration of the turf. It will be observed that rotation of the cultivator blade 16 tends to drive the machine rearwardly. Therefore, in general, it is recommended that the machine be operated by permitting it to travel rearwardly while the operator resists this rearward force sufficiently to effect the desired cultivation of the sod. Further, by the rearward operation, the sod cutting and cultivation and its distribution will be effected uniformly. Since the cultivated sod is thrown somewhat forwardly during operation, if the machine were caused to traverse in a forward direction, the cultivated sod would tend to accumulate and build up in front of the machine.

A pattern of preferred operation is illustrated in FIG. 2. Two swaths X and Y are shown as already cultivated in the turf T, and a third swath Z is being formed. The machine is traveling rearwardly as indicated by arrow D against an appropriate restraint applied by the operator through handle 27, and the cut and chopped sod is thrown in a forward direction and slightly to the right as indicated by the arrows C. After cultivating a swath of convenient length, the machine is relocated next to its original starting position to the left thereof. This may be readily accomplished by rocking the machine chassis back on its rear wheels 12 and 13 through handle 27 and moving the machine forwardly to the next starting position, returning the machine to its operating position, and repeating the cultivation action.

Figure 6:
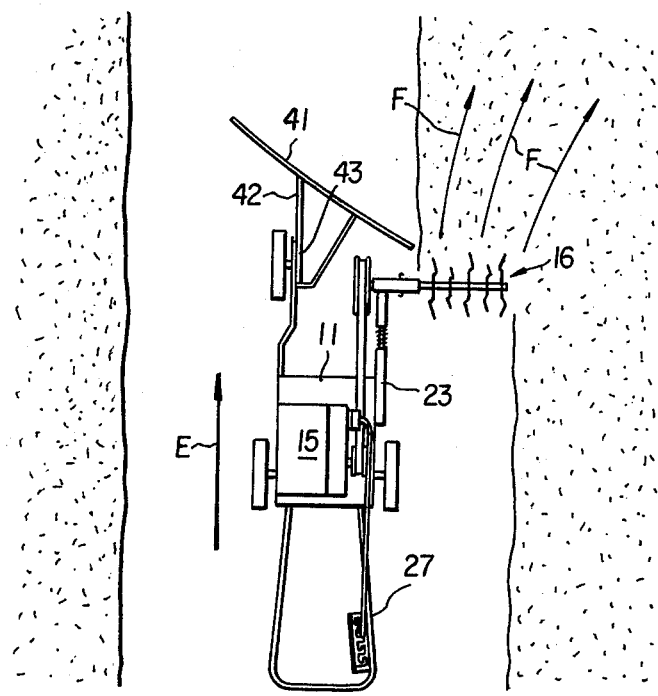
FIG. 6 is a top plan view of the edger of FIG. 1, with the blade shroud removed, and modified to function as a snow blower.

The above-described cultivating attachment can be used also as a snow blower, and that function is illustrated in FIG. 6. For this use, the machine is pushed in the forward direction, as indicated by arrow E, and the blade 16 drives the snow forwardly and to the right as viewed in FIG. 6 and indicated by arrows F. To enhance the efficiency of the machine for this purpose, a plow 41 may be mounted in front of the machine by bracket 42 secured to the forward wheel journal at 43. The added plow enables a wider swath of snow to be cleared on each traverse, as it will direct snow located to the left of blade 16 into the path of the blade.

The clamp structure 60 enables the position of the shroud or guard 17 to be readily pivoted about the axis of journal 22. For cultivator use, it is preferred that the shroud 17 be tilted forwardly, so that debris, etc. thrown by the blade 16 is deflected downwardly by the shroud. For snow blowing use, it is preferred that the shroud be tilted rearwardly, so that the rear portion and rear edge can function as a collector and scraper behind the blade 16.

Figure 7:
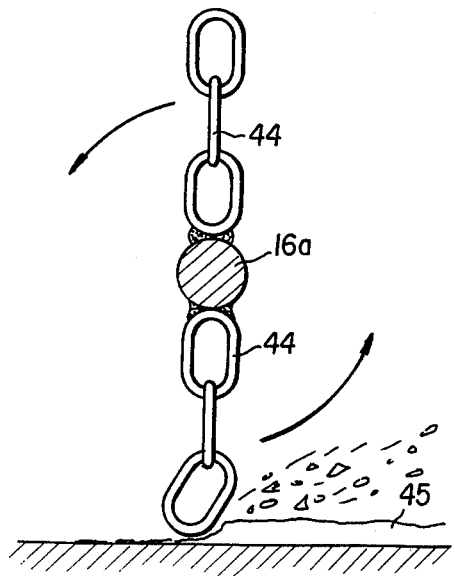
FIGS. 7 and 8 are enlarged fragmentary views of alternative embodiments of blades for attachment to a lawn edger, designed to function as ice chippers.

The attachment feature of the present invention may also be used to convert a usual lawn edger to an ice chipper for sidewalks, driveways, and the like. This is accomplished by providing an alternative rotor or blade in lieu of blade 16. One such alternative blade is indicated in FIG. 7. The blade shaft is indicated by the numeral 16a. Instead of the tines 32, a series of flails formed from short lengths of chain 44 are welded to the shaft 16a along its length. In the use of this embodiment, the chassis bracket 23 (FIG. 1) is pivoted to a position where the ends of the chain lengths 44 just touch the ground below the ice layer, or terminate just above that level. When the blade is driven by the motor 15, the chain lengths 44 act as hammers to chip away the ice layer 45.

Figure 8:
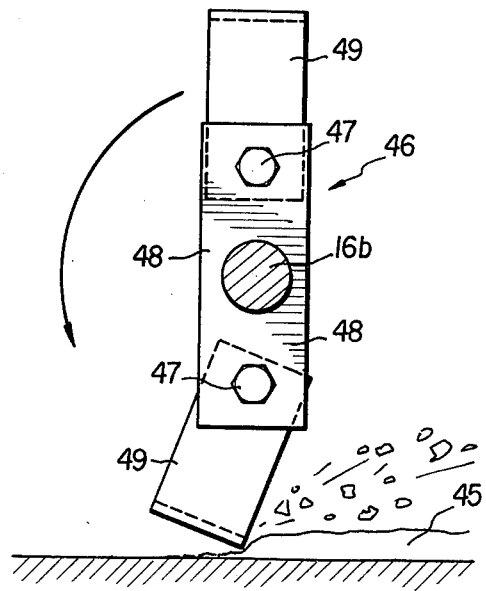
Figure 9:
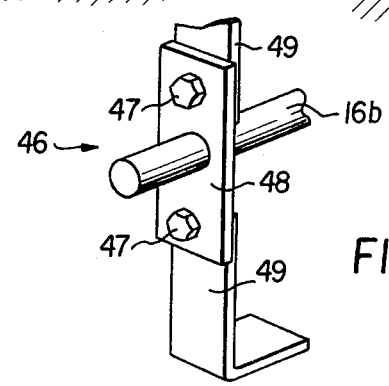
FIG. 9 is a fragmentary perspective view of the ice chipping blade of FIG. 8.

Another form of ice chipping blade is shown in FIGS. 8 and 9. In this case a series of tines 46 are welded to shaft 16b along its length. The end of each tine is an "L" shaped hammer element 49 pivotally connected at 47 to the main tine section 48. On rotation of the shaft 16b, the "L" shaped hammer elements 49 yieldingly hit the ice layer 45 and thereby chip it away.

Figure 12:
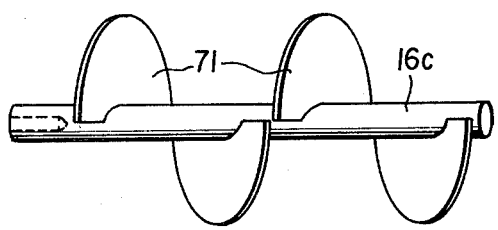
FIG. 12 and 13 are alternative embodiments of blades for attachment to a lawn edger, designed to function for snow removal.
Figure 13:
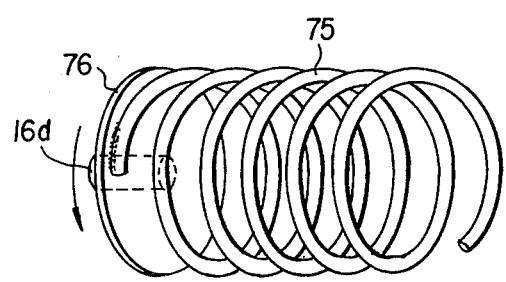

It is apparent that other forms of rotors or blades may be used than those described above. For example, for snow blowing or snow removal purposes, a helicoid conveyor approach is possible, as illustrated in FIGS. 12 and 13. In FIG. 12 a conventional conveyor screw blade is illustrated, comprising the shaft 16c having feed screw blade segments 71 affixed thereto. In FIG. 13, a helically convoluted rod 75 is used as a conveyor. One end of rod 75 is affixed to an end plate 76, carrying a central stub shaft 16d for threaded mounting on drive shaft 21, as heretofore described.

The foregoing embodiments of the invention are presented merely for purposes of illustration, and it is understood that modifications and variations will be apparent to those skilled in the art. For example, the invention is herein described in relation to a three-wheeled lawn edger; however, two-wheeled edgers are also available. Although it is considered that the invention is best applied to the three-wheeled variety, it can be applied to two-wheeled edgers. Accordingly, such variations and modifications as are embraced by the spirit an scope of the appended claims are contemplated as being within the purview of the present invention.

What is claimed is:

1. A wheeled power tool for home yard work and the like, comprising a chassis, a motor supported by said chassis, two rear wheels spaced transversely of the chassis and mounted on either side of said chassis, a drive shaft supported by said chassis at the front thereof on a substantially horizontal axis oriented transversely of said chassis, a multitined rotor having an elongate support shaft coupled at one end to said drive shaft, a plurality of tines affixed to said elongate shaft and spaced axially therealong and extending substantially radially therefrom, said tines being of substantially equal length and including a generally planar mounting portion secured to said elongate shaft, tine portions on opposite diametric sides of said elongate shaft being offset in opposite axial directions and having terminal end portions twisted about their axes so as to define cylindrical surfaces of revolution substantially greater than tine thickness when said rotor is rotated on the axis of said elongate shaft, and said cylindrical surfaces of revolution of successive tines being substantially contigious, each of said tines being spaced circumferentially about the elongate shaft axis on a different radius from all other tines, a power take off means on said motor, and means coupling said power take off means with said drive shaft for transmitting motor power thereto and rotating said rotor about the axis of said elongate shaft.

2. A wheeled power tool as set forth in claim 1, and further including a shroud extending over said rotor.

3. A wheeled power tool as set forth in claim 2, and further including means for mounting said shroud for pivotal adjustment about said elongate shaft.

4. An ice chipping attachment for a motor powered lawn edger of the type having a rotary edging cutter that is motor driven about a vertically adjustable substantially horizontal and generally transversely oriented axis and is removably affixed to a drive shaft, comprising a rotor having an elongate axis, a support shaft on said axis, a plurality of flail members pivoted to flail supports fixed on and radially extending from said support shaft and being spaced axially along said support shaft and each flail member being spaced circumferentially about said support shaft on different radii, and a terminal portion of each flail member being spaced from said support shaft an equal distance and being positioned axially along said support shaft and formed to define together substantially a surface of revolution extending substantially the length of said support shaft when said rotor is rotated about said axis, and said support shaft being threaded at one end thereof and removably coupled to said drive shaft in place of said cutter and supporting said rotor in an orientation with said rotor axis substantially horizontal and generally transverse to the edger.

5. An ice chipping attachment as set forth in claim 4, wherein said flail members are lengths of chain.

6. An ice chipping attachment as set forth in claim 4, wherein said terminal portions of said flail members are each turned at substantially a right angle to the axis of the respective flail member.

7. An ice chipper attachment as set forth in claim 4, 5 or 6, and further including a shroud extending over said motor.

8. An ice chipping attachment as set forth in claim 4, 5 or 6, and further including a shroud extending over said rotor, and means for mounting said shroud for pivotal adjustment about said rotor.

9. A snow removal attachment for a motor powered lawn edger of the type having a rotary edging cutter that is motor driven about a vertically adjustable substantially horizontal and generally transversely oriented axis and is removably affixed to a drive shaft, comprising a rotor having an elongate axis, said rotor comprising a plate at one end having a threaded means removalby coupling to said drive shaft, and a helicoid coil of wire rod of open convolutions having one end mounted to said plate and extending therefrom, said coupling means supporting said coil in an orientation along said elongate axis substantially horizontally and generally transversely to the edger.

10. A snow removal attachment as set forth in claim 9, and further including a shroud extending over said rotor.

11. A snow removal attachment as set forth in claim 10, and further including means for mounting said shroud for pivotal adjustment about said rotor.

* * * * *